Patented Jan. 14, 1936

2,027,440

UNITED STATES PATENT OFFICE 2,027,440

PROCESS FOR THE MANUFACTURE OF ZINC SULPHIDE

Samuel Kremen, New York, N. Y.

No Drawing. Application May 12, 1931,
Serial No. 536,945

10 Claims. (Cl. 23—135)

When zinc is heated with sulphur, a protective film of zinc sulphide is formed on the surface of the metal. The zinc, no longer in direct contact with the sulphur, does not combine with the latter, and the sulphur volatilizes upon further heating, uncombined. On the other hand, a mixture of powdered zinc and sulphur reacts with explosive violence when warmed due to the large amount of heat liberated during this reaction. On account of these difficulties, the processes for the manufacture of zinc sulphide employ substances containing zinc in chemical combination instead of uncombined zinc in spite of the higher costs of those substances. The following process overcomes the above difficulties.

A three per cent zinc amalgam is thoroughly mixed with powdered sulphur. The weight of sulphur used must not be less than one-half of the total zinc contained in the amalgam. The resulting mixture is then warmed to start the reaction. After the reaction is completed, the mercury is distilled over, and the temperature is further raised until the residue is entirely freed from the formed mercuric sulphide by the sublimation of the latter.

The role of the bulk of mercury in this process is threefold: first, to prepare the zinc in a finely divided state which is needed for the reaction; second, to slacken the effect of the large amount of heat liberated during the reaction; third, to utilize that heat for the separation of the mercury from the zinc sulphide. An amalgam containing less than three percent of zinc will allow better control of the process, but it may require considerable additional heating to distill off all the mercury; an amalgam containing more than three per cent of zinc will save some fuel, but the reaction may become less controllable, as the formed mercury vapor may gain a pressure above the atmospheric. A slight excess of sulphur over that needed for the conversion of all the zinc into the sulphide is necessary, as otherwise the product may become contaminated with some uncombined zinc. The distilled off mercury can be utilized, while hot, for the preparation of the zinc amalgam for the next batch in this process.

I claim:

1. The process for the manufacture of zinc sulphide comprising heating an intimate mixture of a dilute zinc amalgam with sulphur until the reaction is completed, distilling off the mercury, and heating the residue until all the mercuric sulphide, if formed, is driven off from the zinc sulphide.

2. The process for the manufacture of zinc sulphide comprising carrying out the combination of zinc and sulphur in mercury, and separating the zinc sulphide from the mercury and any sulphides of mercury that may result from the process.

3. In the process of manufacturing zinc sulphide the step comprising mixing zinc, sulphur, and mercury.

4. In the process of manufacturing zinc sulphide the steps comprising mixing zinc sulphur and mercury and separating the formed zinc sulphide.

5. In the process of manufacturing zinc sulphide the step comprising mixing sulphur and zinc amalgam.

6. In the process of manufacturing zinc sulphide the steps comprising mixing sulphur and zinc amalgam and separating the formed zinc sulphide.

7. In the process of manufacturing zinc sulphide the steps comprising mixing zinc, sulphur, and mercury and heating the mixture.

8. In the process of manufacturing zinc sulphide the steps comprising mixing zinc, sulphur, and mercury, heating the mixture, and separating the formed zinc sulphide.

9. In the process of manufacturing zinc sulphide the steps comprising mixing sulphur and zinc amalgam and heating the mixture.

10. In the process of manufacturing zinc sulphide the steps comprising mixing sulphur and zinc amalgam, heating the mixture, and separating the formed zinc sulphide.

SAMUEL KREMEN.